(12) United States Patent
Ko

(10) Patent No.: US 8,730,344 B2
(45) Date of Patent: May 20, 2014

(54) DIGITAL PHOTOGRAPHING APPARATUS AND METHOD OF CONTROLLING THE SAME FOR SETTING A WHITE BALANCE

(75) Inventor: Dong-min Ko, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/442,934

(22) Filed: Apr. 10, 2012

(65) Prior Publication Data

US 2013/0038752 A1 Feb. 14, 2013

(30) Foreign Application Priority Data

Aug. 12, 2011 (KR) .................. 10-2011-0080648

(51) Int. Cl.
*H04N 9/73* (2006.01)
*H04N 9/04* (2006.01)
*G03B 15/03* (2006.01)

(52) U.S. Cl.
USPC .............. 348/223.1; 348/224.1; 348/269; 396/182

(58) Field of Classification Search
USPC .................................................. 348/223.1
See application file for complete search history.

(56) References Cited

U.S. PATENT DOCUMENTS

| 7,499,083 | B2 * | 3/2009 | Honda | 348/224.1 |
| 7,502,559 | B2 * | 3/2009 | Kim | 396/182 |
| 2006/0067668 | A1 * | 3/2006 | Kita | 396/182 |

\* cited by examiner

*Primary Examiner* — Twyler Haskins
*Assistant Examiner* — Padma Haliyur
(74) *Attorney, Agent, or Firm* — Drinker Biddle & Reath LLP

(57) ABSTRACT

A digital photographing apparatus and method of using the digital photographing apparatus that can manually set a white balance gain. The digital photographing apparatus including a light-emitting device configured to emit light of a plurality of colors; a light-emitting device control unit configured to control light emission of the light-emitting device; an imaging device configured to capture light incident to a subject to generate a plurality of image signals; and a gain setting unit configured to set a white balance gain by using the generated image signals.

16 Claims, 7 Drawing Sheets

DIGITAL PHOTOGRAPHING APPARATUS AND METHOD OF CONTROLLING THE SAME FOR SETTING A WHITE BALANCE

CROSS-REFERENCE TO RELATED PATENT APPLICATION

This application claims the benefit of Korean Patent Application No. 10-2011-0080648, filed on Aug. 12, 2011, in the Korean Intellectual Property Office, the entire disclosure of which is incorporated herein by reference.

BACKGROUND

1. Field of the Invention

The invention relates to a digital photographing apparatus and a method of controlling the same, and in particular, a digital photographing apparatus and method of controlling the same where the white balance is determined based on capturing multiple images after emitting different colors of light.

2. Description of the Related Art

Often, digital photographing apparatuses capture images of subjects where the color of the subject in the captured image does not appear to the human eye to be the correct color. One of the reasons for this is that it is difficult to set a white balance on the digital photographing apparatus. The white balance determines a balance between the different color sensors that are used to capture the image of the subject by the photographing apparatus.

One difficulty in setting the white balance is that images may be captured in very different lighting conditions. For example, an image of a subject may be captured under the sun or under a light bulb. A digital photographing apparatus may be a portable electronic device such as a camera, cellular telephone, or a music player.

One known method to set the white balance is for an object having equal percentages of red R, green G, and blue B, like a gray card to be photographed, and then set the white balance based on the captured image of the gray card. But, it is inconvenient for the user of the photographing apparatus to carry a gray card and to have to take a picture of the gray card to adjust the white balance for different lighting conditions.

SUMMARY

Therefore there is a need in the art for an digital photographing apparatus and method on the digital photographing apparatus for determining a white balance.

According to an embodiment of the invention, there is provided a digital photographing apparatus including: a light-emitting device configured to emit light of a plurality of colors; a light-emitting device control unit configured to control light emission of the light-emitting device; an imaging device configured to capture light incident to a subject to generate a plurality of image signals; and a gain setting unit configured to set a white balance gain by comparing the generated plurality of image signals.

The light-emitting device control unit may be configured to control the light-emitting device to emit light of one of the colors of the plurality of colors sequentially one color at a time for two or more colors of the plurality of colors.

The gain setting unit may be configured to determine a color of the subject from a difference in two or more image signals generated. The two or more image signals may be generated from different colored lights emitted by the light-emitting device.

The gain setting unit may be configured to determine a color temperature of surrounding light by comparing an image signal generated when the light-emitting device emits light with an image signal generated when the light-emitting device does not emit light.

The gain setting unit may be configured to set the white balance gain based on the color of the subject and the color temperature of surrounding light.

The light-emitting device may be configured to emit red (R), green (G), and blue (B) light.

The light-emitting device may be configured to emit cyan (C), magenta (M), and yellow (Y) light.

The light-emitting device may comprise a light-emitting diode (LED) or an organic light-emitting diode (OLED).

The light-emitting device may be installed in the digital photographing apparatus.

The light-emitting device may be detachably attached to the digital photographing apparatus.

The light-emitting device control unit may be integrally formed with the light-emitting device.

A method of controlling a digital photographing apparatus is disclosed. The method may include for each of a plurality of colors of light, emitting light having one of the plurality of colors of light to illuminate a subject, capturing at least some of the emitted light incident to the subject to generate an image signal for each of the plurality of colors of light; and setting a white balance gain based on comparing at least two of the generated image signals.

The emitting light may further include emitting light having one of the plurality of colors sequentially one color at a time.

The setting of the white balance gain may include determining a color of the subject from a difference between at least two of the generated image signals.

The method may include capturing light incident to the subject without first emitting light to generate an image signal; and determining a color temperature of the surrounding light based on comparing the image signal generated without first emitting light with at least one image signal generated with first emitting light.

The setting the white balance gain further may include setting the white balance gain based on the determined color of the subject and the determined color temperature of the surrounding light.

The method may include determining whether or not white balance gain is set to be manually determined or not; and performing the method of claim 12 if white balance gain is set to be manually determined.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
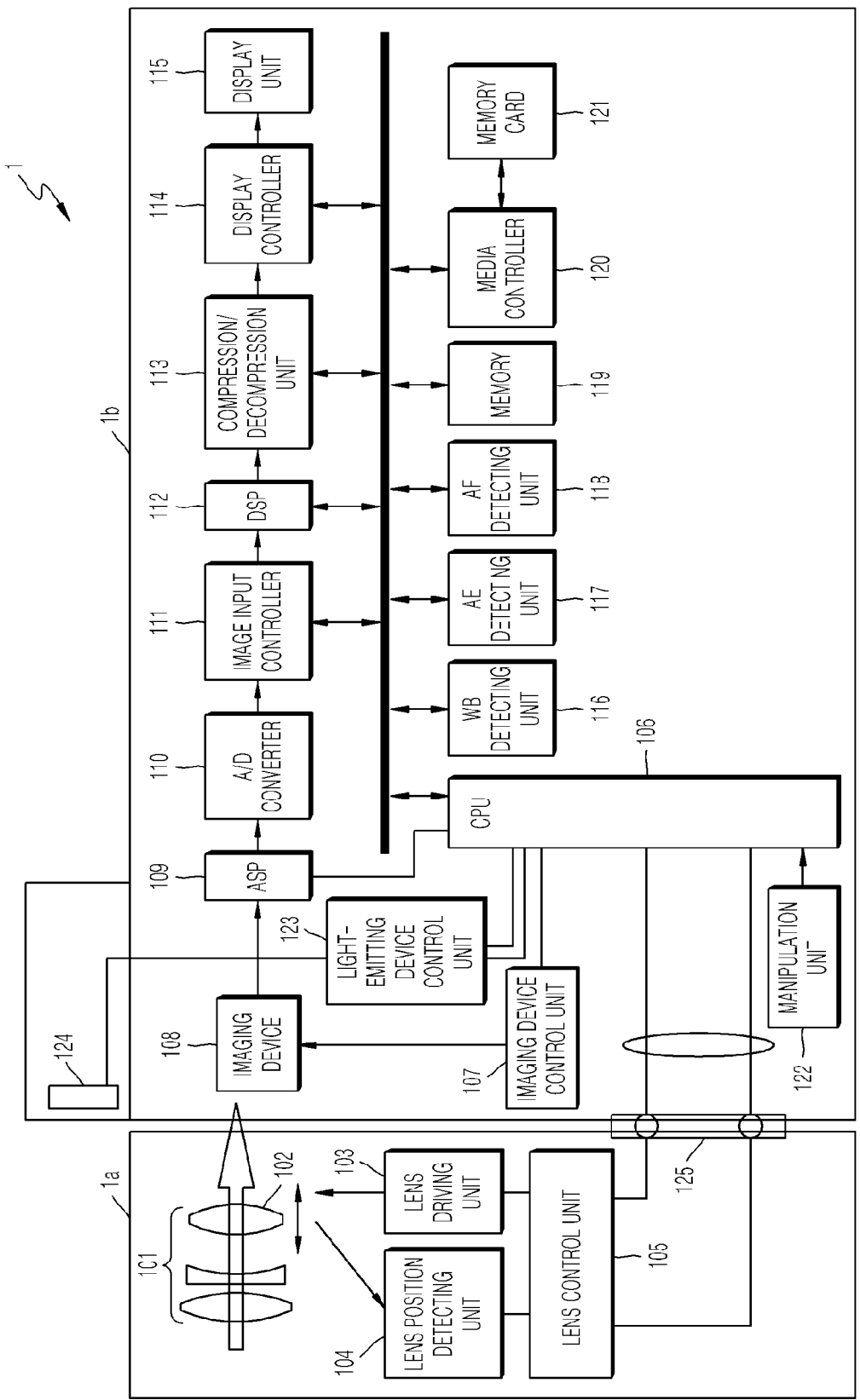
FIG. 1 is a block diagram of an example of a digital photographing apparatus according to an embodiment of the invention.

Hereinafter, the invention will be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals denote like elements. Also, while describing the invention, detailed descriptions about related well-known functions or configurations that may diminish the clarity of the points of the invention are omitted.

Configuration of Digital Photographing Apparatus

FIG. 1 is a block diagram of an example of a digital photographing apparatus 1 according to an embodiment of the invention. The digital photographing apparatus 1 includes a body unit 1b and a lens unit 1a that are separable from each other.

Referring to FIG. 1, the digital photographing apparatus 1 includes the lens unit 1a and the body unit 1b, wherein the lens unit 1a may be detachably attached to the body unit 1b via a lens mount 125.

The lens unit 1a includes an imaging lens 101, a lens driving unit 103, a lens position detecting unit 104, and a lens control unit 105.

The imaging lens 101 includes a focus lens 102 via which focus adjustment may be performed according to driving of the focus lens 102.

The lens driving unit 103 drives the focus lens 102 under the control of the lens control unit 105. The lens position detecting unit 104 detects a position of the focus lens 102 and transmits a detection result to the lens control unit 105.

The lens control unit 105 controls operations of the lens driving unit 103 and receives position information from the lens position detecting unit 104. The lens control unit 105 communicates with a central processing unit (CPU) 106 and sends/receives information related to focus detection to/from the CPU 106.

The body unit 1b includes the CPU 106, an imaging device control unit 107, an imaging device 108, an analog signal processor (ASP) 109, an analog/digital (A/D) converter 110, an image input controller 111, a digital signal processor (DSP) 112, a compression/decompression unit 113, a display controller 114, a display unit 115, a white balance (WB) detecting unit 116, an auto-exposure (AE) detecting unit 117, an AF detecting unit 118, a memory 119, a media controller 120, a memory card 121, a manipulation unit 122, a light-emitting device control unit 123, and a light-emitting device 124.

The CPU 106 controls all operations of the digital photographing apparatus 1.

The imaging device control unit 107 generates a timing signal and applies the timing signal to the imaging device 108, and thus the imaging device control unit 107 controls an imaging operation of the imaging device 108. Also, if accumulation of charges is finished in each scan line of the imaging device 108, the imaging device control unit 107 controls the imaging device 108 to sequentially read image signals.

The imaging device 108 generates image signals by capturing subject image light that has passed through the imaging lens 101. The imaging device 108 may include a plurality of photoelectric conversion devices and charge transmission lines for transmitting charges from the photoelectric conversion devices.

The analog signal processor 109 removes noise from the image signal read by the imaging device 108 or amplifies magnitude of the image signal to a predetermined level. The A/D converter 110 converts an analog image signal output from the analog signal processor 109 into a digital image signal. The image input controller 111 processes the digital image signal output from the A/D converter 110 so that image processing may be performed on the image signal by each of the subsequent elements.

The WB detecting unit 116, the AE detecting unit 117, and the AF detecting unit 118 respectively perform auto white balance (AWB) processing, AE processing, and AF processing on the image signal output from the image input controller 111.

The WB detecting unit 116 according to the current embodiment may include an auto white balance adjustment function used to automatically adjust white balance and a manual (or custom) white balance adjustment function used to manually adjust white balance by user manipulation. The manual white balance adjustment function sets a white balance gain by using an image captured by a user.

When the manual white balance adjustment function is performed, the WB detecting unit 116 detects a color of a subject from a difference in the image signals generated by light emitted from the light-emitting device 124 to be described below. Also, the WB detecting unit 116 may detect a color temperature of surrounding light by using an image signal generated when the light-emitting device 124 does not emit light and an image signal generated when the light-emitting device 124 emits light. That is, the color temperature of surrounding light is detected by using the image signal generated when the light-emitting device 124 does not emit light and the color of the subject. The WB detecting unit 116 may set a white balance gain by using, for example, a color of a subject and/or a color temperature of surrounding light. The WB detecting unit 116 may be an example of a white balance gain setting unit.

The image signal output from the image input controller 111 may be temporarily stored in the memory 119. The memory 119 may include a storage medium such as a synchronous dynamic random access memory (SDRAM).

The digital signal processor 112 performs a series of image signal processing operations such as gamma correction on the image signal output from the image input controller 111 to create a live view image or a captured image that is displayable on the display unit 115.

Also, the digital signal processor 112 may perform white balance adjustment of the captured image according to the white balance gain detected by the WB detecting unit 116.

That is, the digital signal processor 112 and the WB detecting unit 116 may be an example of a white balance control unit.

The compression/decompression unit 113 performs compression or decompression on an image signal on which image signal processing is performed. Regarding compression, the image signal is compressed in, for example, JPEG compression format or H.264 compression format. An image file including image data generated by the compression processing is transmitted to the memory controller 120, and the memory controller 120 stores the image file in the memory card 121.

The display controller 114 controls an image to be output by the display unit 115. The display unit 115 displays various images, such as, for example, a captured image or a live view image, and various setting information. The display unit 115 and the display controller 114 may include a liquid crystal display (LCD) and an LCD driver, respectively. However, the invention is not limited thereto, and the display unit 115 and the display controller 114 may include, for example, an organic light-emitting diode (OLED) display and a driving unit thereof, respectively.

The memory 119 may include a video random access memory (VRAM), which temporarily stores information regarding an image to be displayed on the display unit 115, or an electrically erasable programmable read-only memory (EEPROM), which may store, for example, an execution program, and/or various management information.

The manipulation unit 122 is a unit through which a user inputs various commands for manipulating the digital photographing apparatus 1. The manipulation unit 122 may include, but is not limited by, various buttons such as a shutter release button, a power switch, a mode dial, or a menu button.

The light-emitting device control unit 123 is a unit for driving the light-emitting device 124 that includes a luminous element to radiate light on a subject during photographing or AF driving. The light-emitting device control unit 123 may control the light-emitting device 124 to sequentially emit light of a plurality of colors, or may control the light-emitting device 124 to simultaneously emit light of a plurality of colors or light of some colors, thereby emitting white color or any of various colors.

The light-emitting device 124 emits auxiliary light for AF driving or photographing. The light-emitting device 124 may emit light of a plurality of colors and may include a solid luminous element for emitting light of each color. Also, the light-emitting device 124 may control a color of the auxiliary light by combining a plurality of colors. The solid luminous element included in the light-emitting device 124 may be an LED, an OLED, an electroluminescence (EL) device, or the like.

In the current embodiment, the light-emitting device 124 and the light-emitting device control unit 123 are installed in the body unit 1b.

Figure 2:
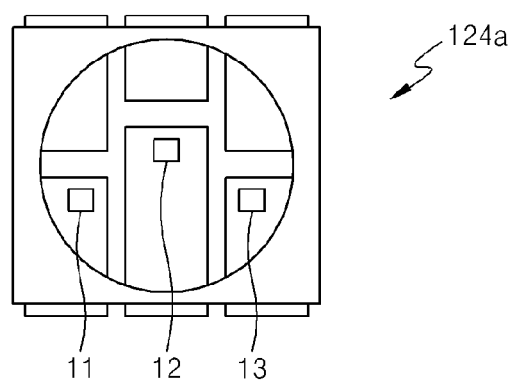
FIG. 2 is a view illustrating an example of a light-emitting device according to another embodiment of the invention.

FIG. 2 is a view illustrating an example of a light-emitting device 124a according to another embodiment of the invention.

Referring to FIG. 2, the light-emitting device 124a may emit light of three different colors. The light-emitting device 124a includes light-emitting devices 11 to 13 for emitting light of respective colors. For example, the light-emitting devices 11 to 13 may be LEDs that emit red (R), green (G), and blue (B) light, respectively. Alternatively, the light-emitting devices 11 to 13 may be LEDs that emit cyan (C), magenta (M), and yellow (Y) light, respectively. However, the invention is not limited thereto, and the light-emitting devices 11 to 13 may emit light of a composite color including various colors.

The light-emitting devices 11 to 13 may be configured as one chip. However, the invention is not limited thereto, and the light-emitting devices 11 to 13 may be individually configured.

The light-emitting device 124a may sequentially emit light of a plurality of colors under the control of the light-emitting device control unit 123 or may simultaneously emit light of all colors. Alternatively, the light-emitting device 124a may sequentially emit light of a composite color including two colors. For example, when the light-emitting device 124a emits light of R, G, and B colors, first, light of R and G colors may be simultaneously emitted, then light of G and B colors may be emitted, and finally, light of B and R colors may be emitted.

Figure 3:
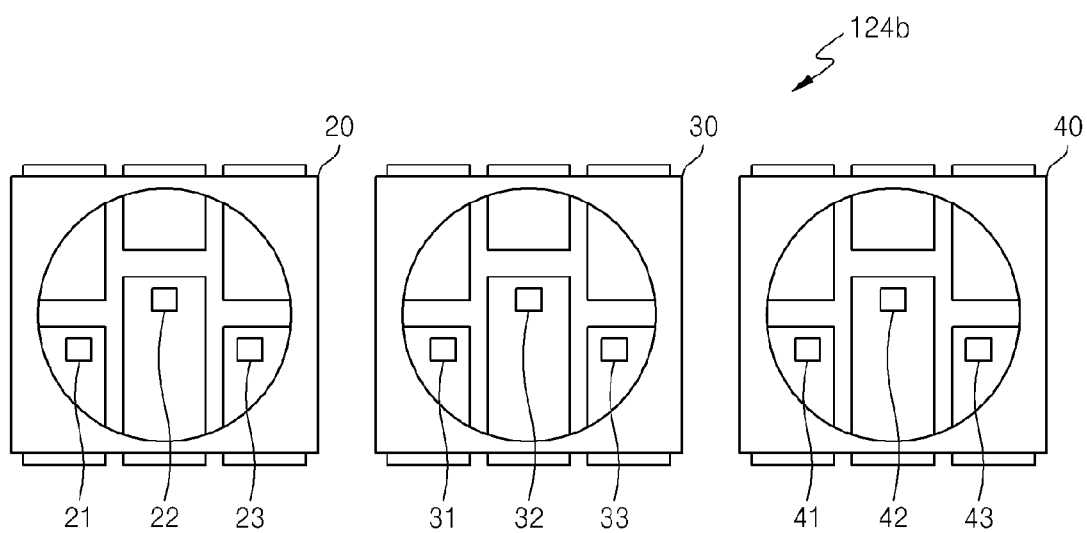
FIG. 3 is a view illustrating an example of a light-emitting device according to another embodiment of the invention.

FIG. 3 is a view illustrating an example of a light-emitting device 124b according to another embodiment of the invention.

Referring to FIG. 3, in order to secure a sufficient amount of light, the light-emitting device 124b includes a plurality of luminous elements for each color. For example, a plurality of light-emitting devices 21 to 23 included in a left chip 20, a plurality of light-emitting devices 31 to 33 included in a central chip 30, and a plurality of light-emitting devices 41 to 43 included in a right chip 40 may emit light of R, G, and B colors, respectively.

In FIGS. 2 and 3, the light-emitting devices 124a and 124b each includes three colors, but the invention is not limited thereto. For example, the light-emitting devices 124a and 124b each may include two colors or four or more colors.

Figure 4:
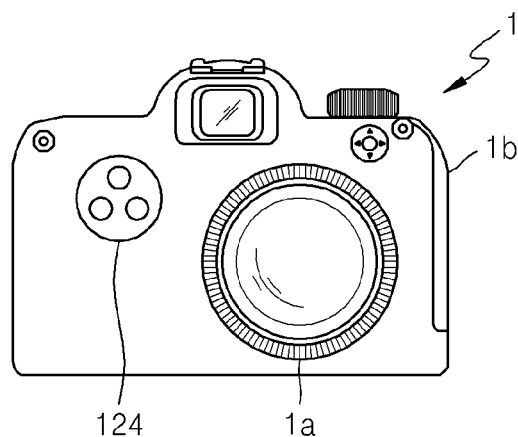
FIG. 4 is a schematic diagram illustrating an example of a digital photographing apparatus according to an embodiment of the invention.

FIG. 4 is a schematic diagram illustrating an example of the digital photographing apparatus 1 according to an embodiment of the invention.

Referring to FIG. 4, the light-emitting device 124 is formed on a front surface of the digital photographing apparatus 1 to radiate auxiliary light on a subject.

Figure 5:
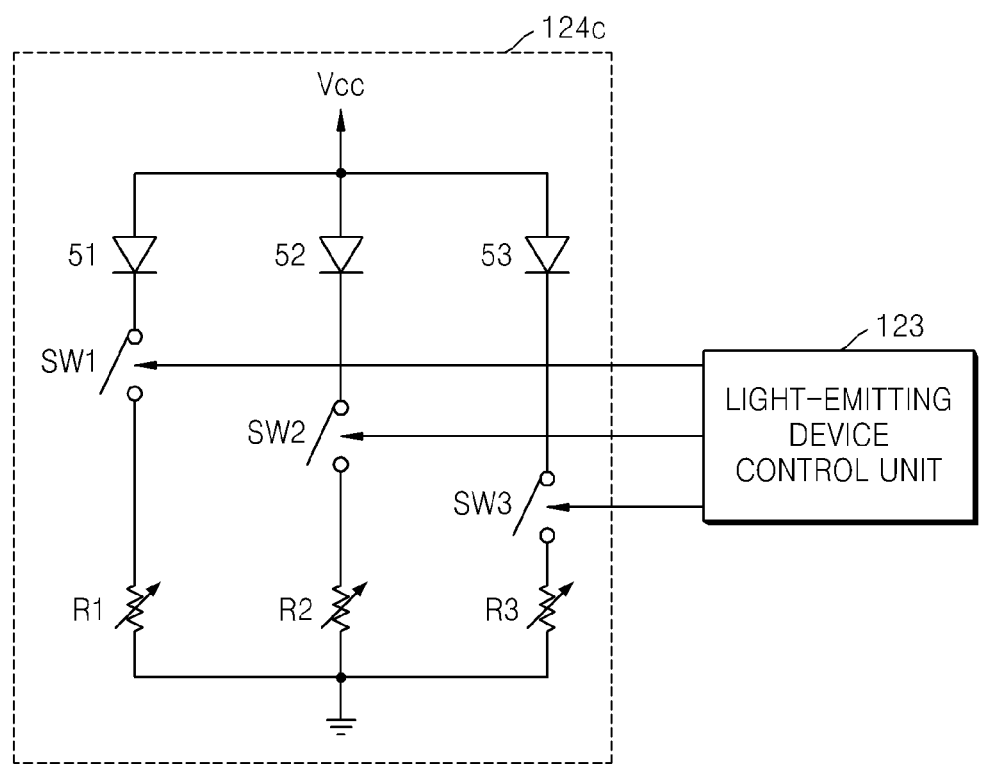
FIG. 5 is a circuit diagram illustrating an example of a light-emitting device and an example of a light-emitting device control unit, according to an embodiment of the invention.

FIG. 5 is a circuit diagram illustrating an example of a light-emitting device 124c and the light-emitting device control unit 123, according to an embodiment of the invention.

Referring to FIG. 5, the light-emitting device 124c includes a plurality of light-emitting devices 51 to 53 that emit light of different colors, a plurality of switching devices SW1 to SW3, and a plurality of resistors R1 to R3. The switching devices SW1 to SW3 control light emission of the light-emitting devices 51 to 53, that is, an ON/OFF operation of each of the light-emitting devices 51 to 53 according to a control signal from the light-emitting device control unit 123. The switching devices SW1 to SW3 may be, for example, a transistor. The resistors R1 to R3 may control the luminance of luminous elements connected thereto. The resistors R1 to R3 may control an amount of current in order to control the luminance of the luminous elements. For this, a variable resistor may be used.

Vcc denotes power used for light emission of the light-emitting device 124c. The power may be used for operations of the body unit 1b.

Figure 6:
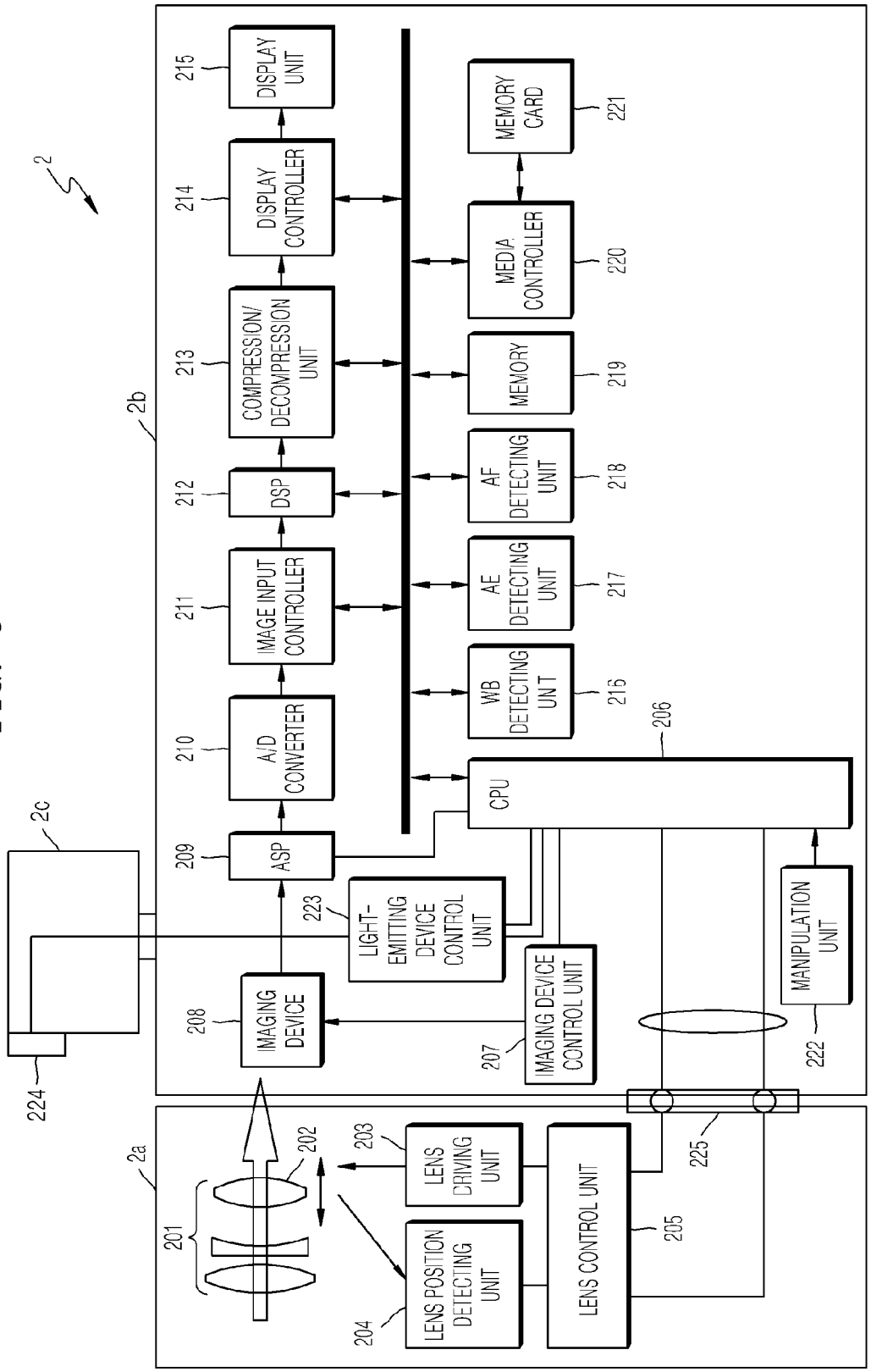
FIG. 6 is a block diagram illustrating an example of a digital photographing apparatus according to another embodiment of the invention.

FIG. 6 is a block diagram illustrating an example of a digital photographing apparatus 2 according to another embodiment of the invention.

The digital photographing apparatus 2 illustrated in FIG. 6 has the same configuration and function as the digital photographing apparatus 1 illustrated in FIG. 1, except that a separate device 2c including a light-emitting device 224 may be detachably attached to a body unit 2b of the digital photographing apparatus 2.

In the digital photographing apparatuses 1 and 2 described with reference to FIGS. 1 and 6, light-emitting device control units 123 and 223 are separately from CPUs 106 and 206.

However, the invention is not limited thereto. For example, the CPUs 106 and 206 may include functions of the light-emitting device control units 123 and 223, thereby directly controlling light emission of the light-emitting devices 124 and 224.

In the current embodiment, power used for light emission of the light-emitting device 224 may be supplied from the body unit 2b. Alternatively, the separate device 2C may include a battery to supply power to the light-emitting device 224 to emit light thereby.

Figure 7:
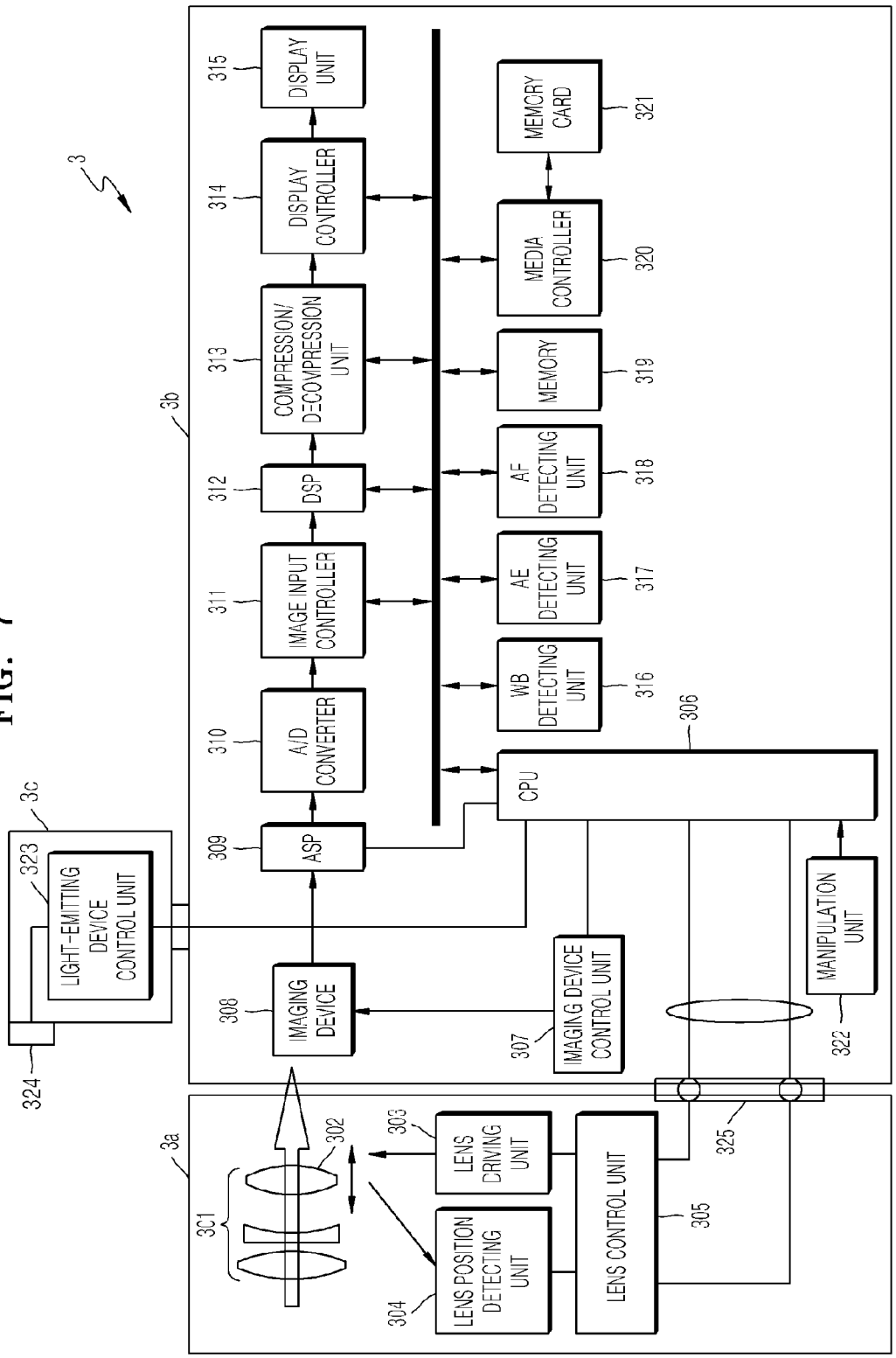
FIG. 7 is a block diagram illustrating an example of a digital photographing apparatus according to another embodiment of the invention.

FIG. 7 is a block diagram illustrating an example of a digital photographing apparatus 3 according to another embodiment of the invention.

In the current embodiment, a light-emitting device control unit 323 is integrally formed with a light-emitting device 324, thereby forming a separate device 3c. The digital photographing apparatus 3 illustrated in FIG. 7 has the same configuration and function as the digital photographing apparatus 1 illustrated in FIG. 1, except that the separate device 3c including the light-emitting device control unit 323 and the light-emitting device 324 may be detachably attached to a body unit 3b of the digital photographing apparatus 3.

In the current embodiment, power used for light emission of the light-emitting device 324 may be supplied from the body unit 3b. Alternatively, the separate device 3c may include a battery to supply power to the light-emitting device 324 to emit light thereby.

Figure 8:
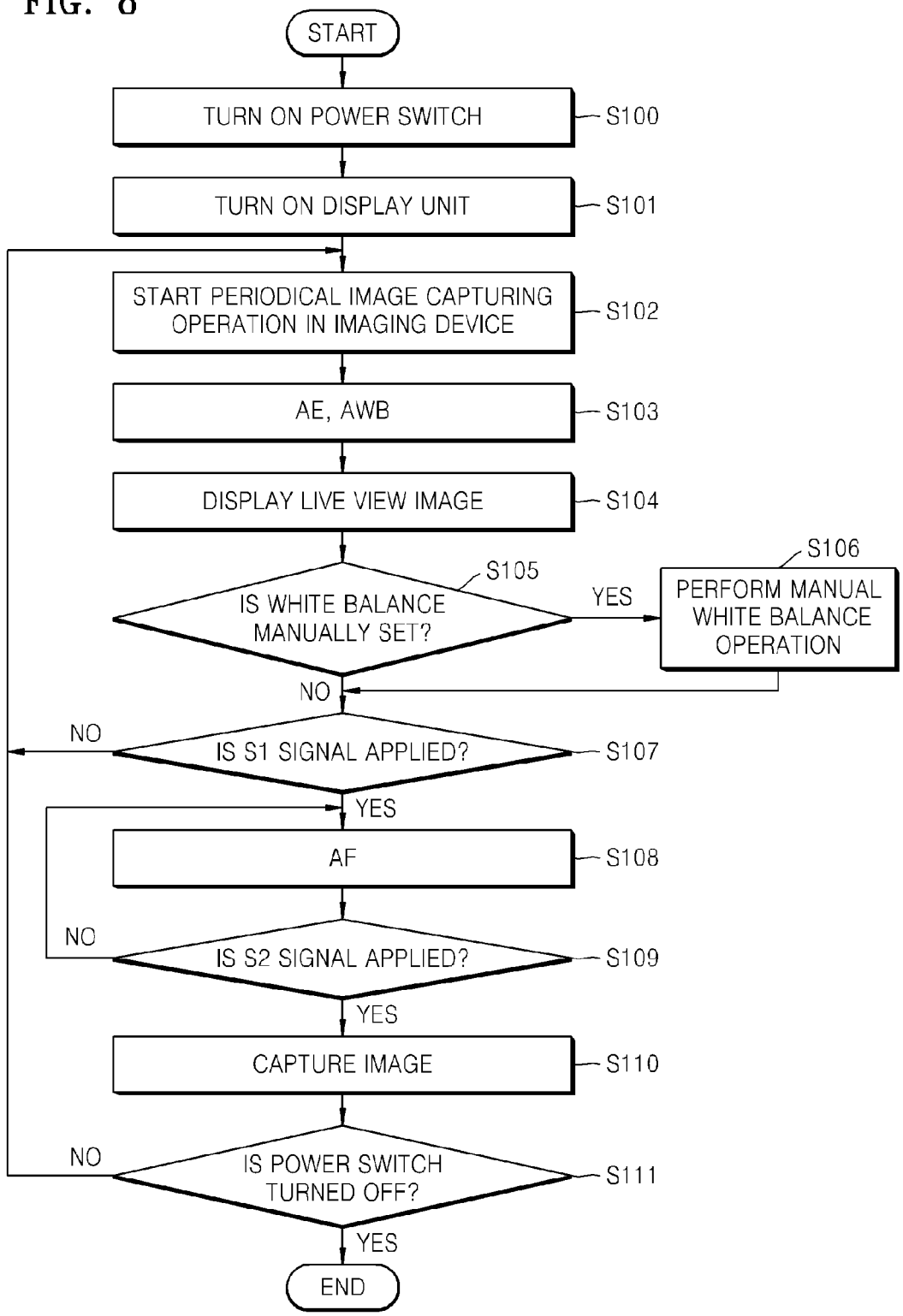
FIG. 8 is a flowchart of a method of controlling a digital photographing apparatus, according to an embodiment of the invention.

FIG. 8 is a flowchart of an example of a method of controlling the digital photographing apparatuses 1 to 3, according to an embodiment of the invention.

Hereinafter, operations of the digital photographing apparatus 1 illustrated in FIG. 1 will be described.

Referring to FIG. 8, if a power switch is turned on by user manipulation (S100), the display unit 115 is turned on (S101).

The imaging device 108 starts a periodical image capturing operation (S102). That is, the imaging device 108 periodically captures subject image light to repeatedly generate image signals, and then performs light metering to perform AE and AWB operations (S103). Then, the imaging device 108 displays the periodically captured images as a live view image (S104).

Next, it is determined whether a user has performed a manipulation by manually setting white balance (S105). If white balance is automatically set, a white balance gain is automatically set from an image captured by an AWB function.

In operation S105, if the user has performed the manipulation by manually setting white balance, a manual white balance operation is performed (S106). A detailed method of performing the manual white balance operation will be described with reference to FIG. 9.

If an auto white balance adjustment function is used, or if a white balance gain is set by the manual white balance operation and then a shutter release button is half-pressed by a user and thus an S1 signal is applied (S107), an AF operation is performed (S108). The AF operation may be performed through various methods, for example, a passive-type AF operation such as contrast AF or an active-type AF operation using a phase-difference method.

When the AF operation is finished, the shutter release button is fully pressed by the user and then an S2 signal is applied (S109), an image is captured, and the captured image is stored in the memory card 121 (S110). Then, if a power switch is turned off, the operation of the digital photographing apparatus 1 is finished. Otherwise, the method returns to operation S102 to repeat operations such as displaying of a live view image, capturing of an image, and the like (S111).

The displaying of a live view image, the capturing of an image, the setting of white balance, etc. are performed by the above-described operations, but the invention is not limited thereto. That is, the order of the operations may be different. For example, if the power switch is turned off at any point of time during the operations S100 to S111, the operation of the digital photographing apparatus 1 may be finished.

Hereinafter, a method of setting a white balance gain by performing a manual white balance operation will be described.

Figure 9:
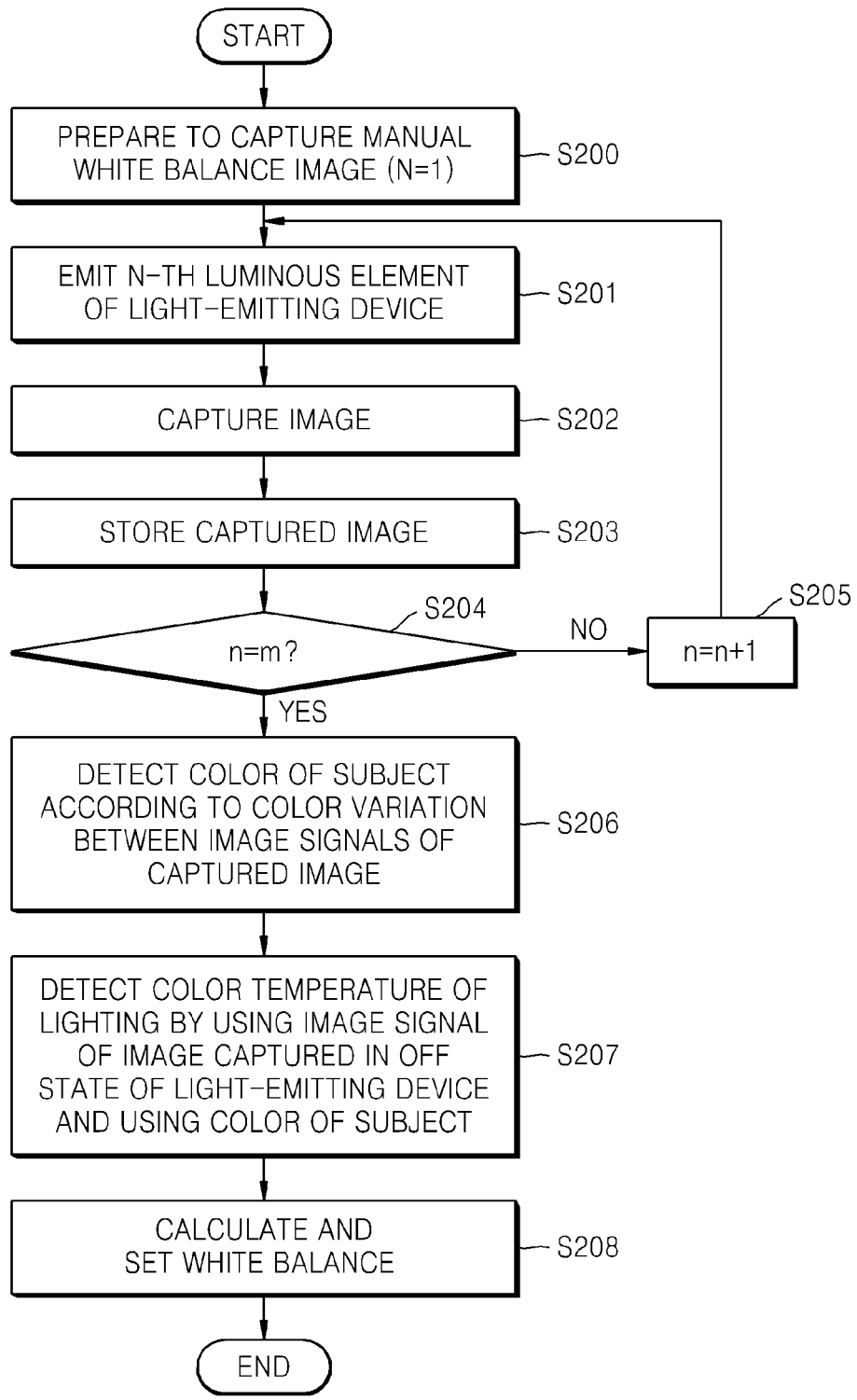
FIG. 9 is a flowchart of a method of setting a white balance gain, according to an embodiment of the invention.

FIG. 9 is a flowchart of a method of setting a white balance gain, according to an embodiment of the invention. In embodiments, a manual setting of a white balance does not include input from the user of the photographing apparatus.

Referring to FIG. 9, when a user manipulates the digital photographing apparatus 1 to perform a manual white balance operation, the digital photographing apparatus 1 is prepared to capture an image for the manual white balance (S200). Then, an n value is set to 1 in order to count the number of light-emitting operations.

The light-emitting device 124 includes a plurality of luminous elements for emitting light of a plurality of colors. Accordingly, the light-emitting device control unit 123 controls light of any one color of the plurality of colors included in the light-emitting device 124 to be emitted (S201). Then, an image is captured while the light-emitting device 124 radiates light on a subject (S202). The captured image is stored in the memory card 121 (S203).

After the image is captured and stored, it is determined whether light of all colors, which may be emitted by the light-emitting device 124, has been emitted (S204). For example, if lights of a total of m colors have been emitted, it is determined whether the n value is equal to the m value. Otherwise, if lights of all the colors have not been emitted, 1 is added to the n value so as to emit light of a color which has not been emitted yet (S205), and the method returns to the operation S201. In embodiments, not all colors are emitted. Additionally, a color may be emitted by emitting light from one or more light generating devices.

On the other hand, if lights of all the colors have been emitted, a color variation between the image signals of the captured image is extracted and a color of the subject is detected or determined according to the extracted color variation (S206). If auxiliary lights of various colors are sequentially emitted from the light-emitting device 124, the image signal varies according to the colors of the subject and the colors of the auxiliary lights. Accordingly, the colors of the subject may be detected or determined based on such a matter.

If the color of the subject is detected or determined, the light-emitting device 124 is turned off, and thus an image is captured in an off state of the light-emitting device 124, and a color temperature of surrounding light is detected by using the image signal of the image and the color of the subject (S207).

If the color temperature of surrounding light is detected, a white balance gain is calculated according to the detected or determined color temperature and a calculation result is set as the white balance gain (S208).

Since the digital photographing apparatus 1 according to the current embodiment may capture an image whenever the light-emitting device 124 sequentially emits light, the digital photographing apparatus 1 may include a successive photographing function. Also, the light-emitting device control unit 123 may control a speed at which the light-emitting device 124 sequentially emits light of a plurality of colors according to a speed at which the digital photographing apparatus 1 captures an image. It takes a predetermined period of time from a first image capturing operation of the digital photographing apparatus 1 to a subsequent image capturing operation. Accordingly, the light-emitting device control unit 123 may properly control a light-emitting time so that the light-emitting device 124 does not emit light of a subsequent color too early.

Conventionally, in order to perform a manual white balance function, a gray card or a subject having a white color is photographed to set a white balance gain. However, it is very inconvenient for a user to always bring the gray card. It is also difficult to find the subject having a white color, and actually, the subject does not always have a complete white color, and thus in this case, the white balance gain may not be correctly set.

However, as described above, according to a digital photographing apparatus and a method of controlling the same of the invention, a manual white balance gain may be correctly set by using a general subject, and thus white balance adjustment may be correctly performed.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium that may be non-transitory. In embodiments, some of the steps and/or actions of a method may be carried out remotely from the digital photographing apparatus with data sent between the digital photographing apparatus and another device. The embodiments of the invention can be written as computer programs and can be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), and storage media.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A digital photographing apparatus comprising:
   a light-emitting device configured to emit light of any one of a plurality of colors;
   a light-emitting device control unit configured to control an intensity and color of light emission of the light-emitting device;
   an imaging device configured to capture light incident on and reflected from a subject to generate a captured image of the subject;
   a control unit configured to control the light-emitting device control unit and the imaging device to generate a plurality of separate images of a subject by:
   (1) illuminating the subject with a single color of light;
   (2) capturing an image of the subject under single-color illumination;
   (3) repeating steps (1) and (2) to generate a plurality of single-color illuminated images using a different single color for each image of the plurality;
   (4) capturing an image of the subject while no light is emitted from the light-emitting device to generate a non-illuminated image; and
   a gain setting unit configured to set a manual white balance gain based on a comparison of the generated plurality of single-color illuminated images and the non-illuminated image.

2. The digital photographing apparatus of claim 1, wherein the gain setting unit is configured to determine a color of the subject from a difference in two or more images, wherein the two or more images are generated from different colored lights emitted by the light-emitting device.

3. The digital photographing apparatus of claim 2, wherein the gain setting unit is configured to determine a color temperature of surrounding light by comparing an image signal generated when the light-emitting device emits light with the image signal generated when the light-emitting device does not emit light.

4. The digital photographing apparatus of claim 3, wherein the gain setting unit is configured to set the white balance gain based on the color of the subject and the color temperature of surrounding light.

5. The digital photographing apparatus of claim 1, wherein the light-emitting device is configured to emit red (R), green (G), and blue (B) light.

6. The digital photographing apparatus of claim 1, wherein the light-emitting device is configured to emit cyan (C), magenta (M), and yellow (Y) light.

7. The digital photographing apparatus of claim 1, wherein the light-emitting device comprises a light-emitting diode (LED) or an organic light-emitting diode (OLED).

8. The digital photographing apparatus of claim 1, wherein the light-emitting device is installed in the digital photographing apparatus.

9. The digital photographing apparatus of claim 1, wherein the light-emitting device is detachably attached to the digital photographing apparatus.

10. The digital photographing apparatus of claim 9, wherein the light-emitting device control unit is integrally formed with the light-emitting device.

11. A method of controlling a digital photographing apparatus having a light-emitting device, the method comprising:
  generating a plurality of separate images of a subject by:
    (1) illuminating the subject with a single color of light from the light-emitting device;
    (2) capturing an image of the subject under single-color illumination;
    (3) repeating steps (1) and (2) to generate a plurality of single-color illuminated images using a different single color for each image of the plurality;
    (4) capturing an image of the subject while no light is emitted from the light-emitting device to generate a non-illuminated image; and
  setting a manual white balance gain based on a comparison of the generated plurality of single-color illuminated images and the non-illuminated image.

12. The method of claim 11, wherein the setting of the white balance gain comprises determining a color of the subject from a difference between at least two of the generated images.

13. The method of claim 12, further comprising:
  determining a color temperature of the surrounding light based on comparing the image signal generated without first emitting light with at least one image signal generated with first emitting light.

14. The method of claim 13, wherein the setting the white balance gain further comprises setting the white balance gain based on the determined color of the subject and the determined color temperature of the surrounding light.

15. The method of claim 11, further comprising:
  determining whether or not white balance gain is set to be manually determined or not; and
  performing the method of claim 11 if white balance gain is set to be manually determined.

16. The method of claim 11, wherein the method is performed on a digital photographing apparatus comprising a light-emitting device comprising a plurality of luminous elements for emitting the light having one of the plurality of colors of light.

* * * * *